(12) United States Patent
Phillips et al.

(10) Patent No.: US 8,872,824 B1
(45) Date of Patent: Oct. 28, 2014

(54) SYSTEM, METHOD, AND COMPUTER PROGRAM PRODUCT FOR PERFORMING SHADOWING UTILIZING SHADOW MAPS AND RAY TRACING

(75) Inventors: Michael Robert Phillips, Sherwood Park (CA); David Patrick Luebke, Charlottesville, VA (US); Jonathan Michael Cohen, Ann Arbor, MI (US); Peter Schuyler Shirley, Salt Lake City, UT (US); David Kirk McAllister, Holladay, UT (US)

(73) Assignee: NVIDIA Corporation, Santa Clara, CA (US)

( * ) Notice: Subject to any disclaimer, the term of this patent is extended or adjusted under 35 U.S.C. 154(b) by 980 days.

(21) Appl. No.: 12/716,825

(22) Filed: Mar. 3, 2010

(51) Int. Cl.
*G06K 9/00* (2006.01)
*G06T 15/50* (2011.01)

(52) U.S. Cl.
USPC .......... 345/426; 345/419; 345/420; 345/421; 382/103; 382/211

(58) Field of Classification Search
None
See application file for complete search history.

(56) References Cited

U.S. PATENT DOCUMENTS

| | | | |
|---|---|---|---|
| 2005/0062995 A1* | 3/2005 | Loce et al. | 358/1.9 |
| 2006/0119600 A1* | 6/2006 | Lokovic et al. | 345/426 |
| 2007/0002047 A1* | 1/2007 | Desgranges et al. | 345/426 |

OTHER PUBLICATIONS

Pan M., Wang R., Chen W., Zhou K., Bao H., Fast, sub-pixel antialiased shadow maps. Comput. Graph. Forum (Proceedings of Pacific Graphics 2009) 28, 7 (2009).*
Maneesh Agrawala, Ravi Ramamoorthi, Alan Heirich and Laurent Moll. Efficient image-based methods for rendering soft shadows. In Computer Graphics (SIGGRAPH 2000), Annual Conference Series, ACM SIGGRAPH, pp. 375-384. 2000.).*
Debevec, P. E., Yu, Y., & Borshukov, G. (Jun. 1998,). Efficient view-dependent image-based rendering with projective texture-mapping. In Eurographics Rendering Workshop (vol. 98, pp. 105-116).).*
Fernando et al (Fernando, Randima, et al. "Adaptive shadow maps." Proceedings of the 28th annual conference on Computer graphics and interactive techniques. ACM, 2001.).*
Hasenfratz, J-M., et al. "A Survey of Real-time Soft Shadows Algorithms." Computer Graphics Forum. vol. 22. No. 4. Blackwell Publishing, Inc, 2004.*
Heckbert (Heckbert, Paul S. "Texture mapping polygons in perspective." NYIT Computer Graphics Lab Technical Memo 13 (1983).).*
Parker, S., Shirley, P., & Smits, B. (1998). Single sample soft shadows. Computer Science Department, University of Utah, Tech. Rep. UUCS-98-019.*

* cited by examiner

*Primary Examiner* — Ulka Chauhan
*Assistant Examiner* — Sultana M Zalalee
(74) *Attorney, Agent, or Firm* — Zilka-Kotab, PC

(57) ABSTRACT

A system, method, and computer program product are provided for performing shadowing utilizing shadow maps and ray tracing. In operation, one or more shadow maps are rendered for at least one light source. Additionally, low confidence pixels associated with the one or more shadow maps are determined. Furthermore, shadow rays associated with the low confidence pixels are traced.

18 Claims, 5 Drawing Sheets

SYSTEM, METHOD, AND COMPUTER PROGRAM PRODUCT FOR PERFORMING SHADOWING UTILIZING SHADOW MAPS AND RAY TRACING

FIELD OF THE INVENTION

The present invention relates to image rendering, and more particularly to producing shadows in images.

BACKGROUND

Current real-time renderers use a rasterization technique known as shadow mapping to produce fast shadows. During shadow mapping, the scene is rendered from the point of view of the light source and a depth value is saved at each pixel that indicates the distance to the closest piece of geometry visible to that pixel. When the scene is rendered from the point of view of the camera, each screen pixel is projected into the shadow map and the distance from that point to the light source computed. A depth comparison with the value stored in the shadow map determines if the screen pixel is the closest point visible to the light source and thus whether the screen pixel is considered to be in shadow or not.

This technique produces fast shadows but may suffer from aliasing. For example, perspective aliasing may occur when the sampling frequency of the shadow map (e.g. rendered from the light source) is too low when sampled in the final image (e.g. rendered from the camera) along surfaces distant from the light source but close to the camera. This may result in shadow edges that appear blocky due to false positives or false negatives.

As another example, projection aliasing may occur when a light source is shining nearly perpendicular to a given surface. This may result in shadow samples being spread across the surface causing spiky shadow edges. In general, aliasing may be expected when the local neighborhood of an object sampled by a camera pixel is partially occluded from the light source.

There is thus a need for addressing these and/or other issues associated with the prior art.

SUMMARY

A system, method, and computer program product are provided for performing shadowing utilizing shadow maps and ray tracing. In operation, one or more shadow maps are rendered for at least one light source. Additionally, low confidence pixels associated with the one or more shadow maps are determined. Furthermore, shadow rays associated with the low confidence pixels are traced.

DETAILED DESCRIPTION

Figure 1:
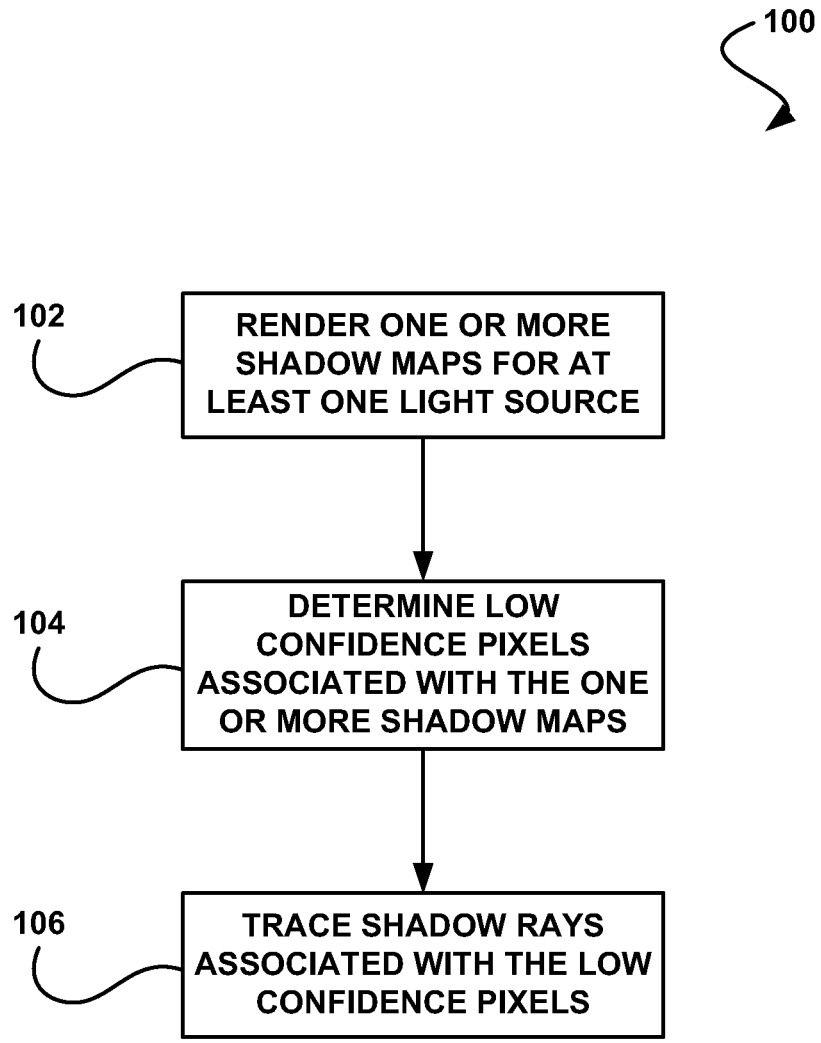
FIG. 1 shows a method for performing shadowing utilizing shadow maps and ray tracing, in accordance with one embodiment.

FIG. 1 shows a method 100 for performing shadowing utilizing shadow maps and ray tracing, in accordance with one embodiment. As shown, one or more shadow maps are rendered for at least one light source. See operation 102. In the context of the present description, a shadow map refers to any map or structure for storing a depth of a surface that is capable of being seen by a light source.

Additionally, low confidence pixels associated with the one or more shadow maps are determined. See operation 104. In the context of the present description, low confidence pixels refer to any pixel or group of pixels that sample a surface or surfaces which have a locally high probability of being partially occluded.

For example, if a set of hypothetical rays drawn from the points on a surface or surfaces visible at a pixel or group of pixels towards a light source would be partially occluded, the pixels may be determined to be low confidence pixels. On the other hand, if all of the rays would be occluded, or all of the rays would be unoccluded (i.e. the surfaces visible at the originating pixels are all visible by the source), the pixels may be determined not to be low confidence pixels. Once the low confidence pixels are determined, shadow rays associated with the low confidence pixels are traced. See operation 106.

It should be noted that the low confidence pixels associated with the one or more shadow maps may be determined utilizing a number of techniques. Furthermore, in various embodiments, these techniques may be applied individually or in combination.

For example, as noted above, determining the low confidence pixels associated with the one or more shadow maps may include determining a likelihood that one or more pixels are in a shadow, out of a shadow, or partially in a shadow. In this case, if it is determined that the pixels are partially in the shadow, the pixels may be determined to be low confidence pixels. As an option, the likelihood that the pixels are partially in a shadow may be associated with a probability value.

In another embodiment, determining the low confidence pixels may include projecting a point associated with one or more pixels into a shadow texture and querying a correct texel and neighboring texels of the correct texel for a result. In this case, it may be determined that the pixels are not low confidence pixels if it is determined that the result for the correct texel and the neighbor texels are coplanar or nearly coplanar.

In another embodiment, determining the low confidence pixels may include utilizing an edge detection technique to find possible shadow edges in the shadow maps. In this case, any shadow texel found to be within an edge may be determined to be associated with a low confidence pixel.

In yet another embodiment, determining the low confidence pixels may include utilizing screen space derivatives to determine a size of projected areas of screen space pixels and shadow texels into a scene. In this case, if the projected areas are different, pixels associated with the projected areas may be determined to be low confidence pixels. As an option, a threshold may be applied to determine if the projected areas are different.

In another embodiment, determining the low confidence pixels may include rendering two shadow maps from each of the plurality of light sources, where one of the two shadow maps uses a geometry unit on a video card to increase a size of triangles associated with that shadow map such that each edge is moved one pixel outward. In this case, an appropriate texel in each of the two shadow maps may be compared to determine the low confidence pixels. Again, it should be noted that the techniques may be utilized individually or in combination to determine the low confidence pixels associated with the one or more shadow maps.

As an option, soft shadows may be rendered utilizing the method 100. In the context of the present description, soft shadows refer to shadows resulting from a light source that is represented by an area. For example, the light source may include an area represented by a plurality of point sources distributed on the area.

In this case, a plurality of shadow maps may be rendered for each of the light sources and each of the plurality of shadow maps may be queried to determine if shadow map values associated with the plurality of shadow maps agree. If the shadow map values associated with the plurality of shadow maps do not agree, it may be determined that pixels associated with the shadow map values are low confidence pixels and shadow rays associated with the low confidence pixels may be traced to render soft shadows.

In either case, determining the low confidence pixels associated with the one or more shadow maps may be utilized to reduce a total number of required shadow rays to render shadows associated with an image. In this way, reducing the total number of required shadow rays to render the shadows associated with the image may eliminate aliasing artifacts caused by shadow mapping by explicitly tracing a minimal number of shadow rays and may reduce a time needed to render accurate shadows.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
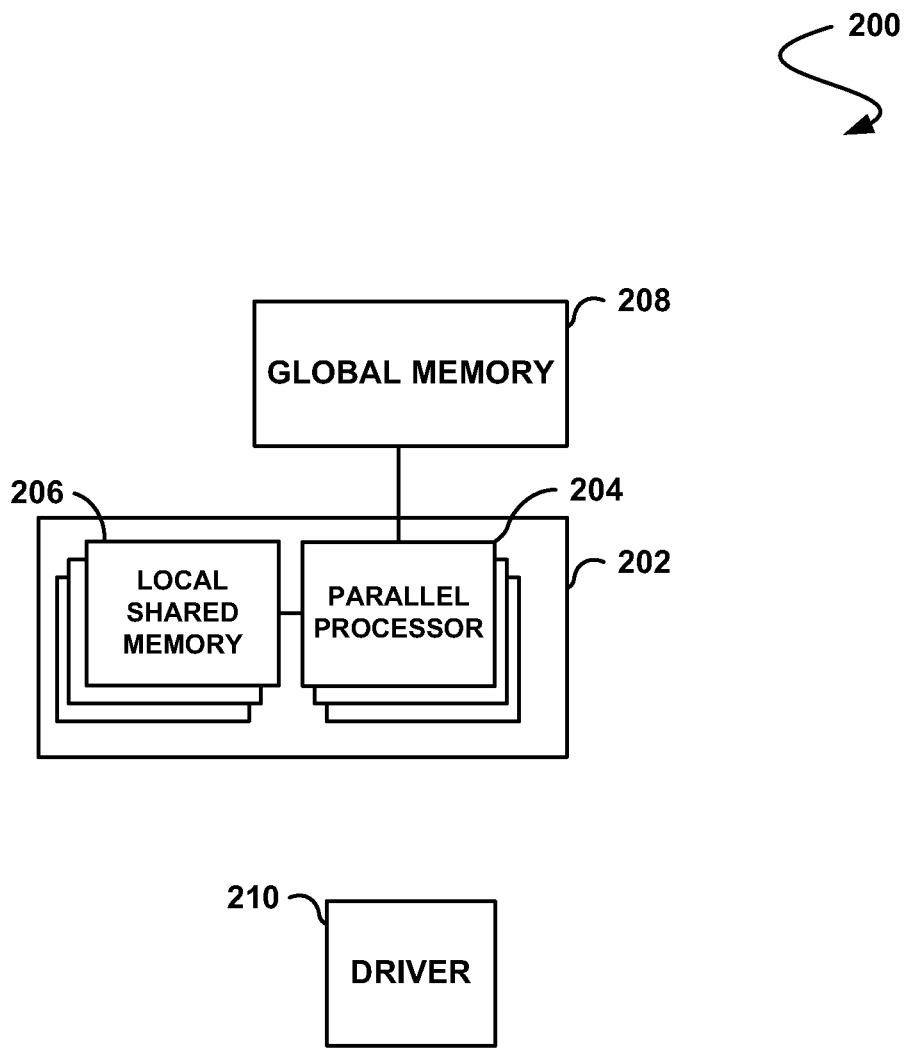
FIG. 2 shows a system for performing shadowing utilizing shadow maps and ray tracing, in accordance with one embodiment.

FIG. 2 shows a system 200 for performing shadowing utilizing shadow maps and ray tracing, in accordance with one embodiment. As an option, the present system 200 may be implemented in the context of the functionality and architecture of FIG. 1. Of course, however, the present system 200 may be implemented in any desired environment. It should also be noted that the aforementioned definitions may apply during the present description.

As shown, a parallel processing architecture 202 is provided. Such parallel processing architecture 202 includes a plurality of parallel processors 204. While not shown, such parallel processors 204 may be capable of operating on a predetermined number of threads. To this end, each of the parallel processors 204 may operate in parallel, while the corresponding threads may also operate in parallel.

In one embodiment, the parallel processing architecture 202 may include a single instruction multiple data (SIMD) architecture. In such a system, the threads being executed by the processor are collected into groups such that, at any instant in time, all threads within a single group are executing precisely the same instruction but on potentially different data.

In another embodiment, the foregoing parallel processing architecture 202 may include a graphics processor or any other integrated circuit equipped with graphics processing capabilities [e.g. in the form of a chipset, system-on-chip (SOC), core integrated with a CPU, discrete processor, etc.]. In still another embodiment, the foregoing parallel processing architecture 202 may include a processor with one or more vector processing elements such as the Cell processor, referring to the Cell Broadband Engine microprocessor architecture jointly developed by Sony®, Toshiba®, and IBM®.

With continuing reference to FIG. 2, the parallel processing architecture 202 may include local shared memory 206. Each of the parallel processors 204 of the parallel processing architecture 202 may read and/or write to its own local shared memory 206. This shared memory 206 may consist of physically separate memories associated with each processor or it may consist of separately allocated regions of one or more memories shared amongst the processors 204. Further, in the illustrated embodiment, the shared memory 206 may be embodied on an integrated circuit on which the processors 204 of the parallel processing architecture 202 are embodied.

Still yet, global memory 208 is shown to be included. In use, such global memory 208 is accessible to all the processors 204 of the parallel processing architecture 202. As shown, such global memory 208 may be embodied on an integrated circuit that is separate from the integrated circuit on which the processors 204 of the aforementioned parallel processing architecture 202 are embodied. While the parallel processing architecture 202 is shown to be embodied on the various integrated circuits of FIG. 2 in a specific manner, it should be noted that the system components may or may not be embodied on the same integrated circuit, as desired.

Still yet, the present system 200 of FIG. 2 may further include a driver 210 for controlling the parallel processing architecture 202, as desired. In one embodiment, the driver 210 may include a library, for facilitating such control. For example, such library 210 may include a library call that may instantiate the functionality set forth herein. Further, in another embodiment, the driver 210 may be capable of providing general computational capabilities utilizing the parallel processing architecture 202 (e.g. a graphics processor, etc.). An example of such a driver may be provided in conjunction with the CUDA™ framework provided by NVIDIA Corporation. In use, the driver 210 may be used to control the parallel processing architecture 202 for performing shadowing utilizing shadow maps and ray tracing.

Figure 3:
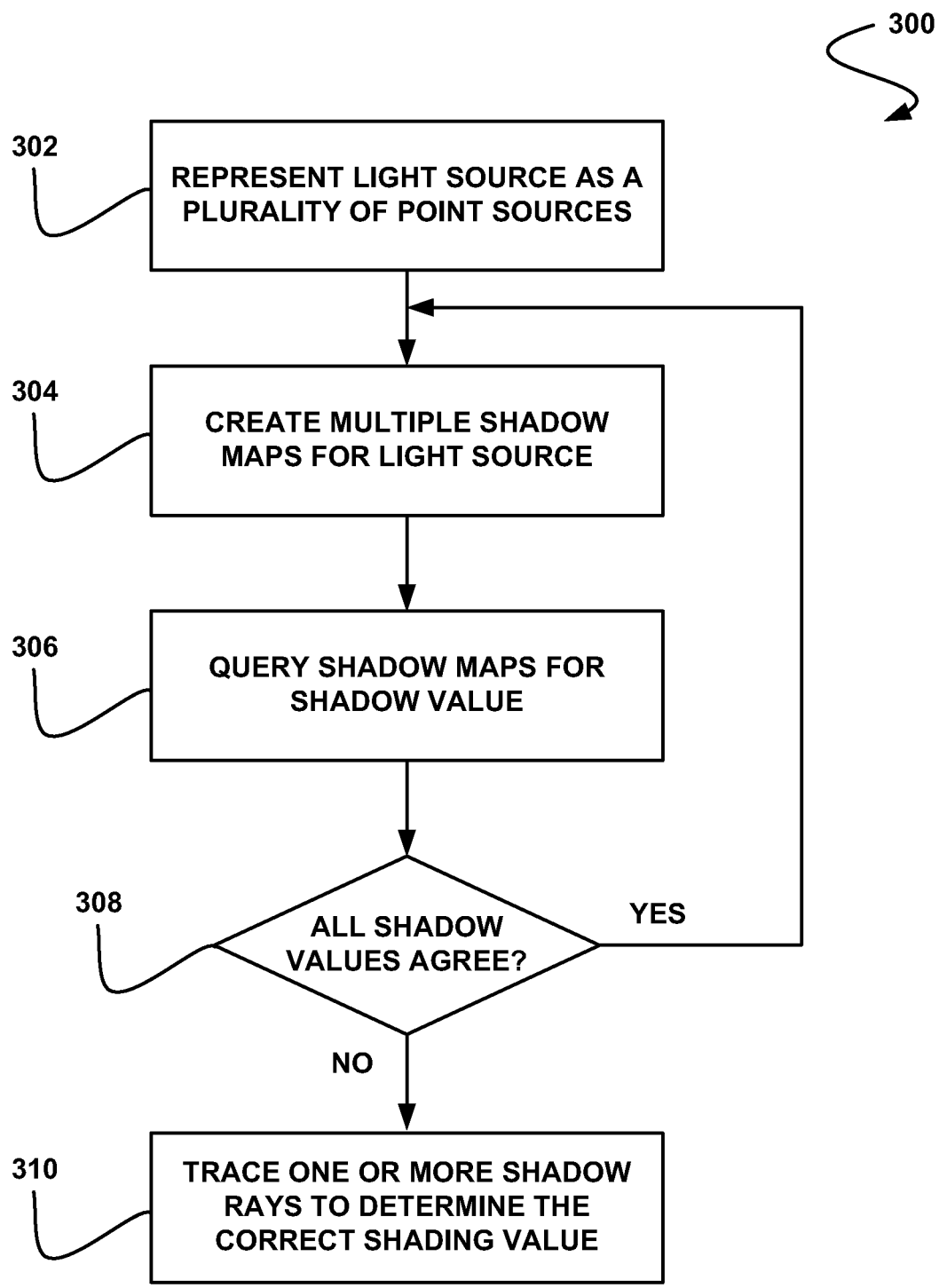
FIG. 3 shows a method for performing shadowing utilizing shadow maps and ray tracing, in accordance with another embodiment.

FIG. 3 shows a method 300 for performing shadowing utilizing shadow maps and ray tracing, in accordance with another embodiment. As an option, the present method 300 may be implemented in the context of the functionality and architecture of FIGS. 1-2. Of course, however, the method 300 may be carried out in any desired environment. Again, the aforementioned definitions may apply during the present description.

As shown, a light source is represented as a plurality of point sources. See operation 302. Multiple shadow maps are then created for the light source. See operation 304.

The shadow maps are then queried for shadow values. See operation 306. It is then determined whether all of the shadow values agree. See operation 308. If the shadow values do not agree, one or more shadow rays are traced to determine the correct shading value. See operation 310.

In this way, the method 300 may be utilized to render soft shadows. In general, soft shadows are much more expensive to render accurately with either rasterization or ray tracing. Ray tracing typically achieves soft shadows by tracing multiple shadow rays toward different points on a light source in order to estimate the amount of light illuminating a point.

Rasterization can analogously achieve soft shadows by rendering many shadow maps from the different points on the light source, and performing many separate shadow map lookups for each screen pixel. In shadow mapping, various approximations, such as percentage closer soft shadows, may be utilized to produce soft shadows. However, these approximations may suffer from aliasing problems, and may not be not physically accurate.

Thus, the techniques described above may be implemented to produce soft shadows by first creating multiple shadow maps per light source. These shadow maps may, for example, be rendered from the extremities of the light source, such as the corners of a square light source. However, it should be noted that the maps may be rendered for any position on the light source.

The shadow maps may then be queried and if they all agree, the shadow value can be determined directly. If the shadow maps disagree, then one or more shadow rays may be traced in order to determine the correct shading value. This technique will result in soft shadows that are faster than a pure ray traced solution and more accurate than approximate rasterization solutions.

Figure 4:
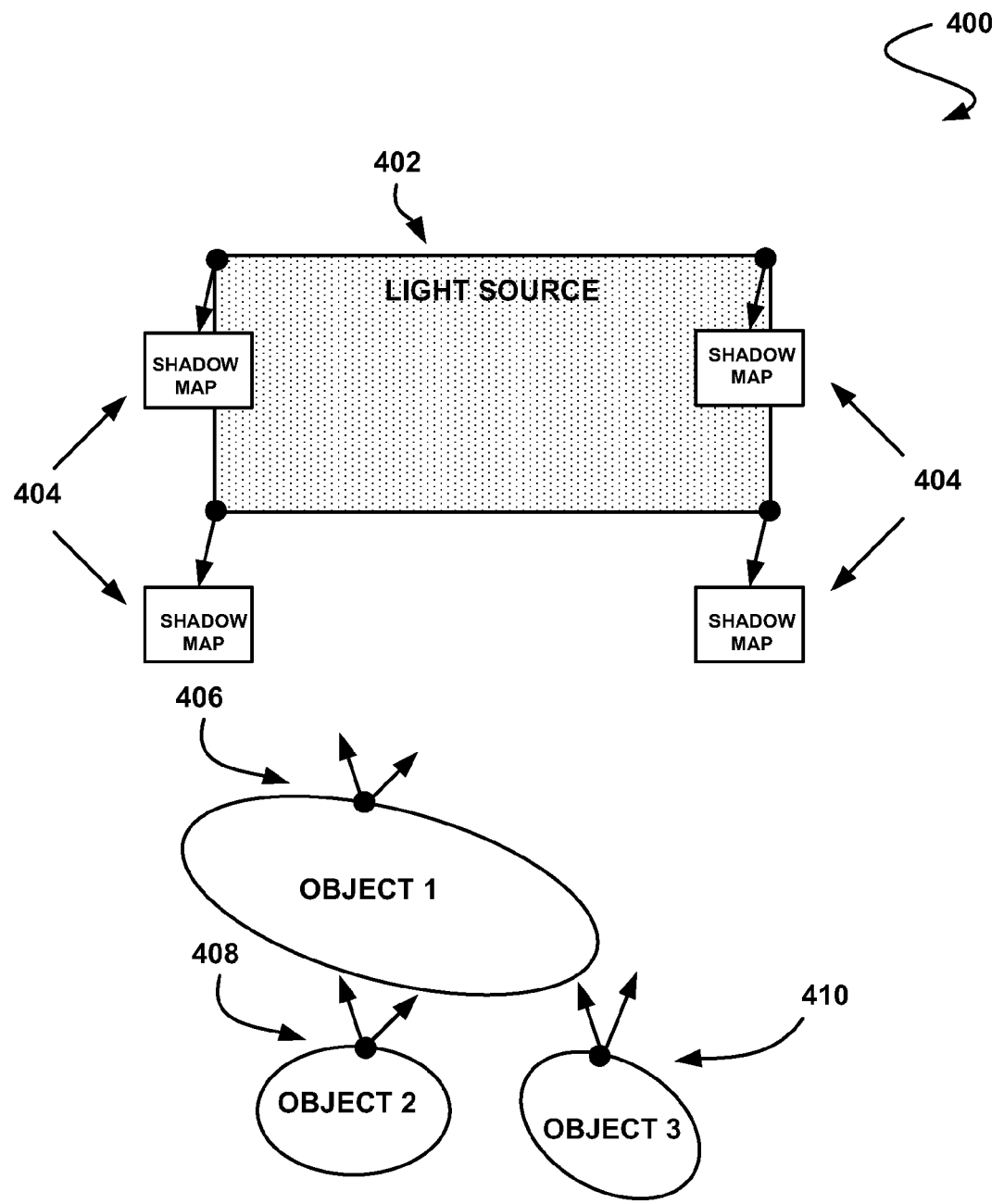
FIG. 4 shows an example of using multiple shadow maps for a light source for performing shadowing utilizing shadow maps and ray tracing, in accordance with one embodiment.

FIG. 4 shows an example 400 of using multiple shadow maps for a light source for performing shadowing utilizing shadow maps and ray tracing, in accordance with one embodiment. As an option, the present example 400 may be implemented in the context of the functionality and architecture of FIGS. 1-3. Of course, however, the example 400 may be implemented in any desired environment. Once again, the aforementioned definitions may apply during the present description.

As shown, a light source 402 is represented by a plurality of shadow maps 404. Furthermore, the shadow maps 404 may be used to determine shading values for objects included in the scene. The objects may include objects with points that are not occluded 406, objects with points that are fully occluded 408, and objects with points that are partially occluded 410.

As shown, the shadow maps 404 may be rendered from the extremities of the light source 402, such as the corners of the square light source 402. The shadow maps 404 may then be queried and if they all agree the shadow value can be determined directly. If the shadow maps disagree, then one or more shadow rays may be traced in order to determine the correct shading value.

Thus, unlike previous implementations, the techniques described above may improve both the quality of rasterized shadows and the speed of ray traced shadows. For example, in high quality rendering, ray tracing is often used, where shadows are calculated by explicitly tracing shadow rays toward the light source. If the ray is occluded before reaching the light source, then the point is in shadow, otherwise it is not. This results in accurate shadows that may not suffer from aliasing artifacts. However, ray traced shadows may be computationally expensive and may increase rendering time significantly.

As described, both rasterization and ray tracing may be combined by first rendering a shadow map for each light source, then using it to reduce the total number of required shadow rays. In this way, aliasing artifacts caused by shadow mapping may be eliminated by explicitly tracing a minimal number of shadow rays, thus reducing the time needed to render accurate shadows.

Using this technique, the shadow map may be queried to determine if a point (i.e. pixel, etc.) is definitely in shadow, definitely not in shadow, or if the point is ambiguous (i.e. a low confidence point). If the point is determined to be in an ambiguous area, then a shadow ray may be explicitly traced to determine if the point is in or out of shadow. This ambiguity test may be performed using a variety of techniques, as described above.

For example, in one embodiment, the point into the shadow texture may be projected and the correct texel, as well as its eight nearest neighbors, may be queried. If all nine texels agree as to whether the light source is occluded, then the point may be determined to be either in or out of shadow directly. If the texels disagree, then the point is ambiguous (i.e. a low confidence point), and a shadow ray may be cast. This technique effectively seeks to find all shadow edges and refines them using ray tracing.

It should be noted that the query point generally lies between texel locations. The cheapest filtering would be to fetch the four nearest neighboring texels. In various embodiments, sampling footprints other than four or nine neighbors may also be used.

In another embodiment, a technique for edge detection, such as Sobel or Canny edge detection may be utilized to find possible shadow edges in the shadow map. Any shadow texel found to be within an edge may be labeled as ambiguous and a shadow ray may be traced. This technique may create better quality shadows by finding internal shadow edges. This allows high frequency shadow detail to be found, such as shadows cast by tree foliage.

In another embodiment, screen space derivatives may be used to determine the size of the projected areas of screen space pixels and shadow texels into the scene. If the areas are different, outside of some small variation, then aliasing may occur and a shadow ray may be spawned. This technique is likely to find ambiguous pixels, but may also cause many shadow rays to be spawned.

In yet another embodiment, two shadow maps may be rendered from each light source. The first shadow map may be the same as described above but the second shadow map may uses a geometry unit on a video card to increase the size of each triangle so that each edge may be moved one pixel outward. Both shadow maps may then be used by comparing the appropriate texel in each shadow map and tracing a ray when they disagree.

These techniques may easily use variations of the simple shadow mapping algorithm, which will increase the quality of the initial shadow estimate, thus reducing the number of shadow rays required. Examples of alternative shadow mapping techniques are perspective shadow maps and cascaded shadow maps. Although, in practice, any shadow mapping technique may be used.

Figure 5:
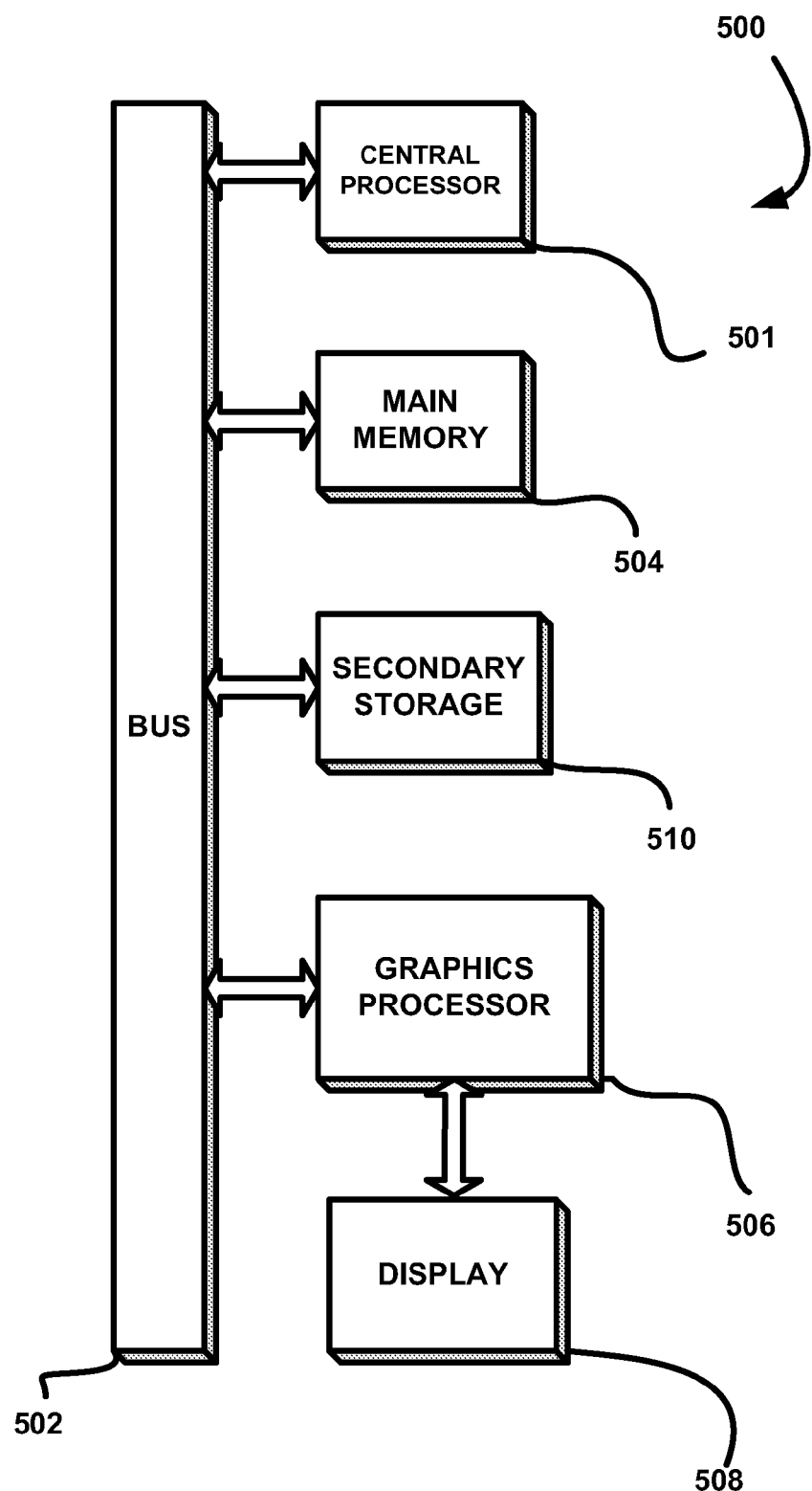
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one host processor 501 which is connected to a communication bus 502. The system 500 also includes a main memory 504. Control logic (software) and data are stored in the main memory 504 which may take the form of random access memory (RAM).

The system 500 also includes a graphics processor 506 and a display 508, i.e. a computer monitor. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the system 500 to perform various functions. Memory 504, storage 510 and/or any other storage are possible examples of computer-readable media.

In one embodiment, the architecture and/or functionality of the various previous figures may be implemented in the context of the host processor 501, graphics processor 506, an integrated circuit (not shown) that is capable of at least a portion of the capabilities of both the host processor 501 and the graphics processor 506, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, lap-top computer, and/or any other type of logic. Still yet, the system 500 may take the form of various other devices including, but not limited to, a personal digital assistant (PDA) device, a mobile phone device, a television, etc.

Further, while not shown, the system 500 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   rendering a first shadow map from a light source for one or more triangles;
   increasing, by a geometry unit, a size of the one or more triangles by moving each edge of the one or more triangles outward to produce increased one or more triangles;
   rendering a second shadow map from the light source for the increased one or more triangles;
   for each pixel associated with a surface, determining whether the pixel is a low confidence pixel by:
      querying a first texel associated with the pixel in the first shadow map,
      querying a second texel associated with the pixel in the second shadow map,
      determining whether the first texel is equal to the second texel, and
      if the first texel is equal to the second texel, then the pixel is not a low confidence pixel, or
      if the first texel is not equal to the second texel, then the pixel is a low confidence pixel; and
   for each low confidence pixel, tracing one or more shadow rays to the light source to determine a shading value for the low confidence pixel.

2. The method of claim 1, wherein, to produce the increased one or more triangles, the size of the one or more triangles is increased by moving each edge of the one or more triangles one pixel outward.

3. The method of claim 1, wherein the one or more shadow rays are projected to at least two point sources of a plurality of point sources that represent the light source to determine the shading value.

4. The method of claim 3, wherein the at least two point sources are rendered from at least two extremities of the light source.

5. The method of claim 4, wherein the light source is a quadrilateral, and the at least two extremities include at least two corners of the quadrilateral.

6. The method of claim 1, wherein the one or more shadow rays are traced to render soft shadows.

7. The method of claim 1, further comprising:
   for each pixel associated with the surface, determining whether the pixel is a low confidence pixel by:
      querying a third texel neighboring the first texel in the first shadow map, determining whether the third texel equals the first texel and the second texel, and
      if the third texel equals the first texel and the second texel, then the pixel is not a low confidence pixel, or if the third texel does not equal at least one of the first texel and the second texel, then the pixel is a low confidence pixel.

8. The method of claim 1, further comprising:
   rendering a third shadow map from an extremity of the light source for the one or more triangles; and
   for each pixel associated with the surface, determining whether the pixel is a low confidence pixel by:
      querying a third texel associated with the pixel in the third shadow map, determining whether the third texel equals the first texel and the second texel, and
      if the third texel equals the first texel and the second texel, then the pixel is not a low confidence pixel, or if the third texel does not equal at least one of the first texel and the second texel, then the pixel is a low confidence pixel.

9. A computer program product embodied on a non-transitory computer readable medium, comprising:
   computer code for rendering a first shadow map from a light source for one or more triangles;
   computer code for increasing, by a geometry unit, a size of the one or more triangles by moving each edge of the one or more triangles outward to produce increased one or more triangles;
   computer code for rendering a second shadow map from the light source for the increased one or more triangles
   computer code for determining, for each pixel associated with a surface, whether the pixel is a low confidence pixel by:
      querying a first texel associated with the pixel in the first shadow map,
      querying a second texel associated with the pixel in the second shadow map,
      determining whether the first texel is equal to the second texel, and
      if the first texel is equal to the second texel, then the pixel is not a low confidence pixel, or
      if the first texel is not equal to the second texel, then the pixel is a low confidence pixel; and
   computer code for tracing, for each low confidence pixel, one or more shadow rays to the light source to determine a shading value for the low confidence pixel.

10. The computer program product of claim 9, wherein the size of the one or more triangles is increased by moving each edge of the one or more triangles one pixel outward.

11. The computer program product of claim 9, wherein the one or more shadow rays are projected to at least two point sources of a plurality of point sources that represent the light source to determine the shading value.

12. The computer program product of claim 9, further comprising:
    computer code for determining, for each pixel associated with the surface, whether the pixel is a low confidence pixel by:
        querying a third texel neighboring the first texel in the first shadow map,
        determining whether the third texel equals the first texel and the second texel, and
        if the third texel equals the first texel and the second texel, then the pixel is not a low confidence pixel, or
        if the third texel does not equal at least one of the first texel and the second texel, then the pixel is a low confidence pixel.

13. The computer program product of claim 9, further comprising:
    rendering a third shadow map from an extremity of the light source for the one or more triangles; and
    computer code for determining, for each pixel associated with the surface, whether the pixel is a low confidence pixel by:
    querying a third texel associated with the pixel in the third shadow map, determining whether the third texel equals the first texel and the second texel, and
    if the third texel equals the first texel and the second texel, then the pixel is not a low confidence pixel, or if the third texel does not equal at least one of the first texel and the second texel, then the pixel is a low confidence pixel.

14. An apparatus, comprising:
    one or more processors for:
        rendering a first shadow map from a light source for one or more triangles;
        increasing, by a geometry unit, a size of the one or more triangles by moving each edge of the one or more triangles outward to produce increased one or more triangles;
        rendering a second shadow map from the light source for the increased one or more triangles;
        for each pixel associated with a surface, determining whether the pixel is a low confidence pixel by:
            querying a first texel associated with the pixel in the first shadow map,
            querying a second texel associated with the pixel in the second shadow map,
            determining whether the first texel is equal to the second texel, and
            if the first texel is equal to the second texel, then the pixel is not a low confidence pixel, or
            if the first texel is not equal to the second texel, then the pixel is a low confidence pixel; and
        for each low confidence pixel, tracing one or more shadow rays to the light source to determine a shading value for the low confidence pixel.

15. The apparatus of claim 14, wherein each edge of the one or more triangles is moved one pixel outward.

16. The computer program product of claim 14, wherein the one or more shadow rays are projected to at least two point sources of a plurality of point sources that represent the light source to determine the shading value.

17. The apparatus of claim 14, further comprising:
    for each pixel associated with the surface, determining whether the pixel is a low confidence pixel by:
        querying a third texel neighboring the first texel in the first shadow map,
        determining whether the third texel equals the first texel and the second texel, and
        if the third texel equals the first texel and the second texel, then the pixel is not a low confidence pixel, or
        if the third texel does not equal at least one of the first texel and the second texel, then the pixel is a low confidence pixel.

18. The apparatus of claim 14, further comprising:
    rendering a third shadow map from an extremity of the light source for the one or more triangles; and
    for each pixel associated with the surface, determining whether the pixel is a low confidence pixel by:
        querying a third texel associated with the pixel in the third shadow map,
        determining whether the third texel equals the first texel and the second texel, and
        if the third texel equals the first texel and the second texel, then the pixel is not a low confidence pixel, or
        if the third texel does not equal at least one of the first texel and the second texel, then the pixel is a low confidence pixel.

* * * * *